United States Patent
Kim et al.

(10) Patent No.: US 9,547,757 B2
(45) Date of Patent: Jan. 17, 2017

(54) USER TERMINAL, SERVER AND CONTROLLING METHOD THEREOF

(75) Inventors: Young-seol Kim, Seoul (KR); Jae-won Lee, Yongin-si (KR); Sung-gun Jung, Anyang-si (KR)

(73) Assignee: Samsung Electronics Co., Ltd (KR)

(*) Notice: Subject to any disclaimer, the term of this patent is extended or adjusted under 35 U.S.C. 154(b) by 1089 days.

(21) Appl. No.: 13/012,461

(22) Filed: Jan. 24, 2011

(65) Prior Publication Data

US 2011/0202751 A1    Aug. 18, 2011

(30) Foreign Application Priority Data

Feb. 12, 2010   (KR) .................. 10-2010-0013528

(51) Int. Cl.
*G06F 21/00* (2013.01)
*G06F 21/12* (2013.01)
*G06F 21/10* (2013.01)

(52) U.S. Cl.
CPC ............ *G06F 21/125* (2013.01); *G06F 21/10* (2013.01)

(58) Field of Classification Search
CPC ...................................... G06F 21/10
USPC .......................................... 705/51
See application file for complete search history.

(56) References Cited

U.S. PATENT DOCUMENTS

| | | | |
|---|---|---|---|
| 2002/0196939 A1* | 12/2002 | Unger | ............. H04N 7/162 380/216 |
| 2002/0197528 A1* | 12/2002 | Zunke | ................ G06F 8/65 429/144 |
| 2003/0177400 A1 | 9/2003 | Raley et al. | |
| 2007/0050643 A1 | 3/2007 | Negishi | |
| 2007/0113103 A1 | 5/2007 | Ye et al. | |
| 2009/0031141 A1 | 1/2009 | Pearson et al. | |
| 2011/0004874 A1* | 1/2011 | Nakashima | ........... G06F 21/121 717/175 |

FOREIGN PATENT DOCUMENTS

| | | |
|---|---|---|
| EP | 1 076 279 | 2/2001 |
| KR | 100753787 | 8/2007 |
| KR | 1020080039150 | 5/2008 |
| WO | WO 96/18951 | 6/1996 |

OTHER PUBLICATIONS

Korean Office Action dated Feb. 2, 2016 issued in counterpart application No. 10-2010-0013528, 13 pages.

(Continued)

*Primary Examiner* — James A Reagan
(74) *Attorney, Agent, or Firm* — The Farrell Law Firm, P.C.

(57) ABSTRACT

A user terminal is provided, including a communication interface unit which receives an application content at least part of which is encrypted, a storage unit which stores the received application content, a decryption unit which decrypts the application content, a user interface unit which receives a command to execute the application content, and a controlling unit which controls the decryption unit to install an application content stored in the storage unit in an encrypted state and decrypt the installed application content according to the execution command. Accordingly, an application, which is an executable content, may be downloaded and installed in a user terminal, and used and updated safely.

14 Claims, 13 Drawing Sheets

(56) References Cited

OTHER PUBLICATIONS

European Search Report dated Jan. 26, 2016 issued in counterpart application No. 11151321.4-1870, 5 pages.
Chinese Office Action dated Aug. 4, 2015 issued in counterpart application No. 201110036800.5, 16 pages.
Chinese Office Action dated Dec. 3, 2014 issued in counterpart application No. 201110036800.5.

* cited by examiner

FIG. 9A

| AppID | Version | AEK (Application Encryption Key) | AHI (Application Hash Info.) | IMEI | CSN (CPU Serial Number) | Telephone Number | ... |

FIG. 9B

| AppID | Version | AEK (Application Encryption Key) | AHI (Application Hash Info.) | IMSI | ... |

FIG. 9C

| AppID | Version | AEK (Application Encryption Key) | AHI (Application Hash Info.) | IMEI | CSN (CPU Serial Number) | Telephone Number | IMSI | ... |

FIG. 10

| ENCRYPTION LEVEL \ FILE SIZE | 1Mbytes | 2Mbytes | 3Mbytes | 4Mbytes | 5Mbytes | 10Mbytes |
|---|---|---|---|---|---|---|
| WHOLE ENCRYPTION | 0.3 | 0.55 | 0.81 | 1.03 | 1.34 | 2.75 |
| 1/2 ENCRYPTION | 0.22 | 0.41 | 0.62 | 0.85 | 1.03 | 2.01 |
| 1/4 ENCRYPTION | 0.16 | 0.37 | 0.51 | 0.68 | 0.82 | 1.65 |
| 1/16 ENCRYPTION | 0.13 | 0.27 | 0.37 | 0.5 | 0.64 | 1.24 |
| NO ENCRYPTION | 0.1 | 0.2 | 0.3 | 0.4 | 0.5 | 1.0 |

USER TERMINAL, SERVER AND CONTROLLING METHOD THEREOF

PRIORITY

This application claims priority under 35 U.S.C. §119(a) to Korean Application No. 10-2010-0013528, filed in the Korean Intellectual Property Office on Feb. 12, 2010, the entire disclosure of which is incorporated by reference.

BACKGROUND OF THE INVENTION

1. Field of the Invention

The present invention generally relates to a user terminal, a server, and a controlling method thereof, and, more particularly, to a user terminal using an application content, which is partially encrypted, a server, and a controlling method thereof.

2. Description of the Related Art

A conventional Digital Rights Management (DRM) system is designed to manage the rights of digital content, which is reproduced by another player, such as a document, music and movie. Such a DRM system has been used to protect an application, which is executable digital content. Specifically, all digital content is encrypted and the encryption key is included in an object called a license, to which a provider's signature is added before being distributed. The distributed content and license are installed on a user's terminal, the license is parsed by a designated DRM client, and the content is decrypted using the encryption key and then executed by a designated viewer or player.

A conventional DRM system, which is designed to protect digital content such as music and movie, may decrypt the latter portion of the content while the former portion of the content is being reproduced, even though the entire content are encrypted. Therefore, encryption of content does not have a significant impact on its reproduction time. However, if an application is encrypted, the encrypted file must be decrypted in its entirety and only then can it be executed. Thus, the longer the decryption time is, the longer it takes to reproduce the application. Such delay in reproduction time may cause inconvenience to a user and reduce the user's desire to purchase.

While content such as music and movies are rarely updated once they are downloaded, an application must frequently be patched and updated. However, conventional DRM systems do not have a protocol to receive a license again when an application is updated. Therefore, it is difficult to use the conventional DRM system to protect an application.

The main purpose of a conventional DRM system is to protect content which must be reproduced and thus, the main purpose of DRM design is to guarantee the confidentiality of the content. On the other hand, in order to protect an application, combinability is more important than confidentiality.

SUMMARY OF THE INVENTION

An aspect of the embodiments relates to a user terminal using a partially encrypted application content, server and a controlling method thereof.

A user terminal, according to an embodiment of the present invention, includes a communication interface unit which receives an application content at least part of which is encrypted, a storage unit which stores the received application content, a decryption unit which decrypts the application content, a user interface unit which receives a command to execute the application content, and a controlling unit which controls the decryption unit to install an application content stored in the storage unit in an encrypted state and decrypt the installed application content according to the execution command.

The user terminal may further include a license parsing unit which parses a license of the application content and obtains a decryption key for decrypting the application content, and the decryption unit may decrypt the installed encrypted application content using the decryption key.

A server, according to an embodiment of the present invention, includes an encryption unit which encrypts at least one application content, a communication interface unit which transmits the partially encrypted application content to a user terminal, and a controlling unit which controls the encryption unit to partially encrypt the application content.

The server may further include a license issuing unit which issues a license including a decryption key for decrypting the partially encrypted application content.

A method for controlling a user terminal, according to an embodiment, includes receiving an application content at least part of which is encrypted, storing the received application content, installing the stored encrypted application content an encrypted state, and decrypting the encrypted application content according to the execution command to execute the encrypted application content.

The method may further include parsing a license of the application content and obtaining a decryption key for decrypting the application content, and the decrypting may include performing decryption using the decryption key.

The method may further include requesting a server to update the application content and receiving files needed to be updated from among a plurality of files constituting the application content and a new license of a content to be updated from the server.

A method for controlling a server, according to an embodiment of the present invention, includes partially encrypting at least one application content and transmitting the partially encrypted application content to a user terminal.

The method may further include issuing a license including a decryption key for decrypting the partially encrypted application content.

The method may further include receiving a request to update the application content from the user terminal and transmitting files needed to be updated from among a plurality of files constituting the application content to the user terminal.

The method may further include receiving an ID, current version information, and a license of the application content are received as the update is requested, reissuing a new license for a content to be updated, and transmitting the newly issued license and new version information of the content to be updated to the user terminal.

Accordingly, an application which is an executable content may be downloaded and installed in a user terminal, and used and updated safely.

BRIEF DESCRIPTION OF THE DRAWINGS

The above and other aspects, features and advantages of the present invention will be more apparent from the following detailed description taken in conjunction with the accompanying drawings, in which:

FIGS. 9A to 9C illustrate the structure of a license applicable to an application content according to an embodiment of the present invention; and FIG. 10 illustrates the effect of partial encryption according to an embodiment of the present invention.

DETAILED DESCRIPTION OF EMBODIMENTS OF THE PRESENT INVENTION

Hereinafter, preferred embodiments of the present invention will be described with reference to the accompanying drawings. In the following description, detailed description of known functions and configurations incorporated will be omitted when it may make the subject matter of the present invention rather unclear.

Figure 1:
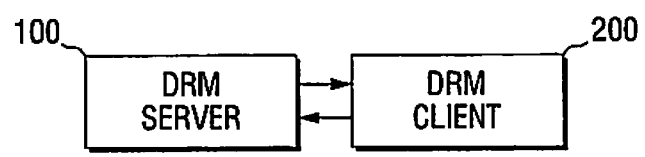
FIG. 1 is a block diagram illustrating a schematic configuration of a DRM system according to an embodiment of the present invention.

FIG. 1 is a block diagram illustrating a schematic configuration of a DRM system according to an embodiment.

The DRM system illustrated in FIG. 1 includes a DRM client 100 and a DRM server 200.

The present DRM system manages the rights of an application content provider and distributor while an executable content is being downloaded, delivered, installed, and updated from a user terminal. The executable content may be an application content (referred to as an application or an application program).

The DRM server 200 encrypts at least part of a pre-stored application content and transmits the encrypted content to a DRM client 200.

The DRM client 100 may download an application content, a part of which is encrypted from the DRM server 200, decrypt and use the content when the content is executed, instead of when the content is installed. The DRM client 100 may be embodied as an apparatus that supports a mobile terminal such as a cellular phone, a Portable Media Player (PMP), and an MP3 player, and a network such as DTV and PC.

According to the present invention, application content may be downloaded through a general PC via the Internet or Over The Air (OTA) in a mobile device regardless of the medium.

Hereinafter, the configuration of the DRM client 100 and the DRM server 200 will be explained in detail.

Figure 2:
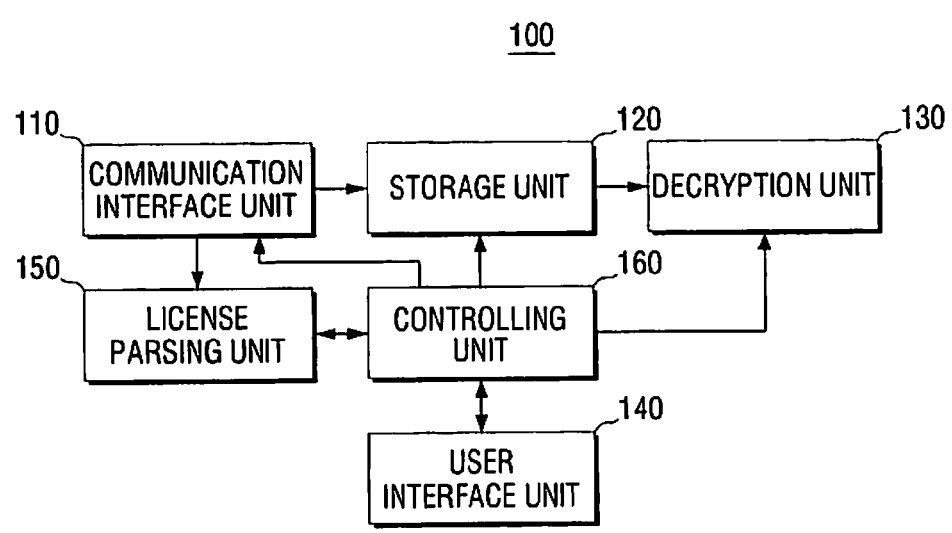
FIG. 2 is a block diagram illustrating the configuration of a user terminal according to an embodiment of the present invention.

FIG. 2 is a block diagram illustrating the configuration of a user terminal according to an embodiment.

According to FIG. 2, a user terminal 100 includes a communication interface unit 110, a storage unit 120, a decryption unit 130, a user interface unit 140, a license parsing unit 150, a controlling unit 160. The user terminal 100 may be embodied as the DRM client 100 illustrated in FIG. 1.

The communication interface unit 110 supports data communication with a server (not shown). Specifically, the communication interface unit 110 may receive an encrypted application content from a server.

The communication interface unit 110 may receive an application which is partially encrypted from a server.

The partially encrypted application content may be an application content in which at least one file constituting the application content is encrypted. At least one file may be an executable file (e.g., an "exe" file) for executing an application.

At least one encrypted file may include an encryption area and a non-encryption area.

At least one file constituting application content may be divided into blocks having a predetermined scale, and at least one block may include an encryption area and a non-encryption area.

For example, the predetermined scale may be 4 Kbytes, which is a general memory upload scale. An encryption level may be different according to the size of the encryption area of a block. That is, each block may be ½ encrypted (level 1), each block may be ¼ encrypted (level 2), each block may be ¹⁄₁₆ encrypted (level 3), or each block may be entirely encrypted (level 4). However, this is only an example, and other embodiments will be explained later.

According to an embodiment, an application may be partially encrypted as long as the encryption does not compromise confidentiality of data, which is the initial purpose of encryption.

The storage unit 120 stores encrypted application content downloaded through the communication interface unit 110. The storage unit may be embodied in various formats (Flash, HDD, RAM, ROM and so on) depending on the type of the user terminal 100. For example, if the user terminal 100 is embodied as a mobile terminal, the storage unit may be embodied in a flash memory.

The decryption unit 130 decrypts an encrypted application content stored in the storage unit 120. Specifically, the decryption unit 130 may perform decryption when the content is executed, instead of when the content is installed under the control of the controlling unit 160. That is, an encrypted application content is decrypted when the content is installed after being executed in an encrypted state. A detailed explanation regarding the decryption will be provided later with respect to the functions of the controlling unit 160.

The user interface unit 140 receives a user's command regarding the overall functions provided by the user terminal 140.

The user interface unit may include a manipulation key (not shown) for receiving a user's command to control the operation of a user terminal and a window (not shown) such as a Liquid Crystal Display (LCD) for displaying various functions provided by a user terminal. In addition, the user interface unit 140 may be embodied in an apparatus such as a touch pad, which is capable of performing input and output simultaneously.

The license parsing unit 150 may parse the license of an application content provided by a server and obtain a decryption key for decrypting the application content from the license. Accordingly, the decryption unit 130 may perform decryption using the decryption key obtained through the license parsing unit 150.

The controlling unit 160 controls the overall functions of the user terminal 100. In particular, the controlling unit 160 installs an encrypted application content stored in the storage unit 120 in the user terminal 100 in an encrypted state.

The controlling unit 160 may control the decryption unit 130 to decrypt an encrypted application content when the application content is executed according to a user's application execution command input through the user interface unit 140.

The controlling unit 160 may also request that a server update an application content provided by the server, and may control the communication interface unit 110 to receive only files which need to be updated from among a plurality of files constituting an application content.

The controlling unit 160 may transmit the ID, current version information, and license of content to the server when there is a request for an update of the application content. New version information and newly issued license of a content to be updated may be received from the server through the communication interface unit 110.

The decryption unit 130 may be protected through a Secure Boot function, which permits access only to authorized users at the time of booting based on a Hardware Security Module (HSM).

The HSM may be embodied as a Trusted Platform Module (TPM), a Mobile Trusted Module (MTM), and a Trusted Computing Group (TCG). Among these modules, the TPM will be explained briefly.

The TPM is a module for providing a trusted platform in hardware, and performing the operation of generating a public key and encrypting/decrypting application content.

The Secure Boot function refers to a function, which permits access only to those who are authorized since booting and may be performed using a boot loader and a boot image.

The boot loader is a program, which is executed very first when the user terminal 100 is turned on, and the boot loader loads a kernel of an operating system and transmits several kernel parameters to a kernel. The boot loader may manage a boot loader image, a kernel image, and an RAM disk image. Since a boot loader is a known technology, further description will not be provided.

Figure 3:
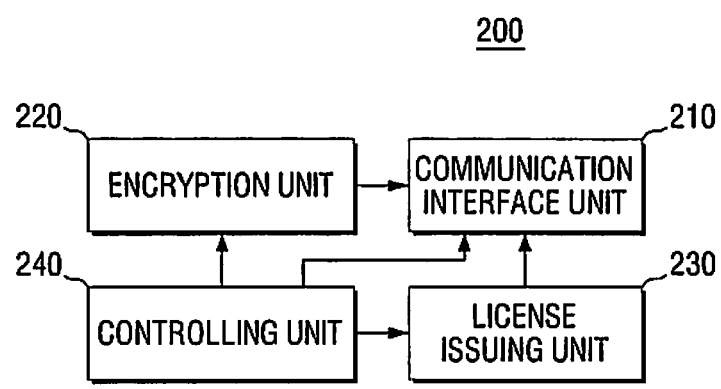
FIG. 3 is a block diagram illustrating the configuration of a server according to an embodiment of the present invention.

FIG. 3 is a block diagram illustrating the configuration of a server according to an embodiment.

According to FIG. 3, a server 200 includes a communication interface unit 210, an encryption unit 220, a license issuing unit 230, and a controlling unit 240.

The server 200 may be embodied as the DRM server, as illustrated in FIG. 1.

The communication interface unit 210 supports data communication with the user terminal 100. Specifically, the communication interface unit 210 transmits application content encrypted by the encryption unit 220 to the user terminal 100.

The encryption unit 220 encrypts at least one application content. Specifically, the encryption unit 220 may partially encrypt at least one application content.

Specifically, the encryption unit 220 may encrypt at least one file constituting an application content. At least one file may be an executable file (e.g., an "exe" file) for executing an application.

Additionally, the encryption unit 220 may perform encryption so that at least one file constituting an application content includes an encryption area and a non-encryption area.

The encryption unit 220 may also divide at least one file constituting an application into blocks having a predetermined scale, and at least one block may include an encryption area and a non-encryption area.

For example, the predetermined scale of a block may be 4 Kbytes, which is a general memory upload scale. An encryption level may be different depending to the size of the encryption area of a block. That is, each block may be ½ encrypted (level 1), each block may be ¼ encrypted (level 2), each block may be ¹⁄₁₆ encrypted (level 3), or each block may be entirely encrypted (level 4).

However, the above cases are only examples. Therefore, each block may be encrypted alternately or one portion of a file may be encrypted without being divided into blocks.

The license issuing unit 230 issues a license including a decryption key for decrypting an application content which is partially encrypted by the encryption unit 220.

The controlling unit 240 controls the encryption unit 220 to partially encrypt at least one application content.

If the controlling unit 240 receives a request to update an application content from the user terminal 100, the controlling unit 240 may control the communication interface unit 210 to transmit files which must be updated from among a plurality of files constituting an application content to the user terminal 100.

If the controlling unit 240 receives the ID, current version information, and license of the application content to be updated along with the request for update, the controlling unit 240 may control the license issuing unit 230 to reissue a new license of the application content to be updated. The controlling unit 240 may control the communication interface unit 210 so that the license issuing unit 230 transmits the reissued license and new version information of the application content to be updated.

The server 200 may further include a storage unit (not shown) for storing an encrypted digital content and application.

Figure 4A:
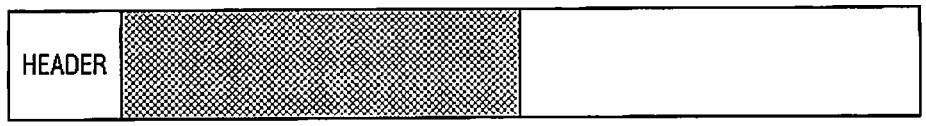
FIGS. 4A to 4C illustrate a method for performing partial encryption according to various embodiments of the present invention.
Figure 4B:
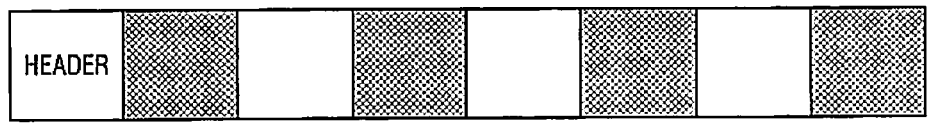
Figure 4C:
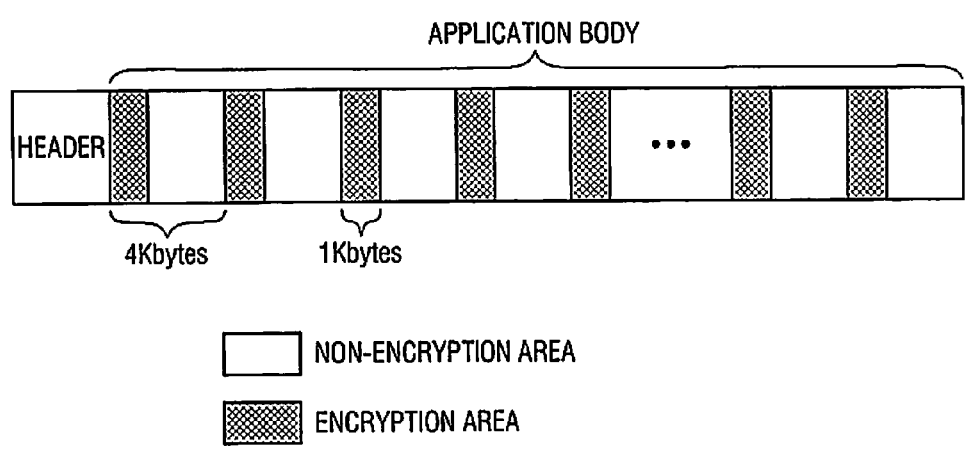

FIGS. 4A to 4C illustrate a method for performing the partial encryption according to various embodiments. For convenience of explanation, the files illustrated in FIGS. 4A to 4C are assumed to be executable files for executing an application content. As illustrated in FIGS. 4A to 4C, execution files for executing an application content may be partially encrypted in various forms. Specifically, as illustrated in FIG. 4A, the body of an executable file may include an encryption area and a non-encryption area. Alternatively, as illustrated in FIG. 4B, the body of an executable file, which is divided into predetermined block units may include an encryption area and a non-encryption area in each block alternately.

As illustrated in FIG. 4C, each block in the body of an executable file, which is divided into predetermined block units, may include an encryption area and a non-encryption area.

Each block is divided by the unit of 4 Kbytes in FIGS. 4B and 4C, but this is only an example. The scale of each block may be set appropriately depending on the occasion. Moreover, 1 Kbyte of each block is encrypted (applying the above-mentioned level 2) in FIG. 4C, but, again, this is also merely an example.

Figure 5:
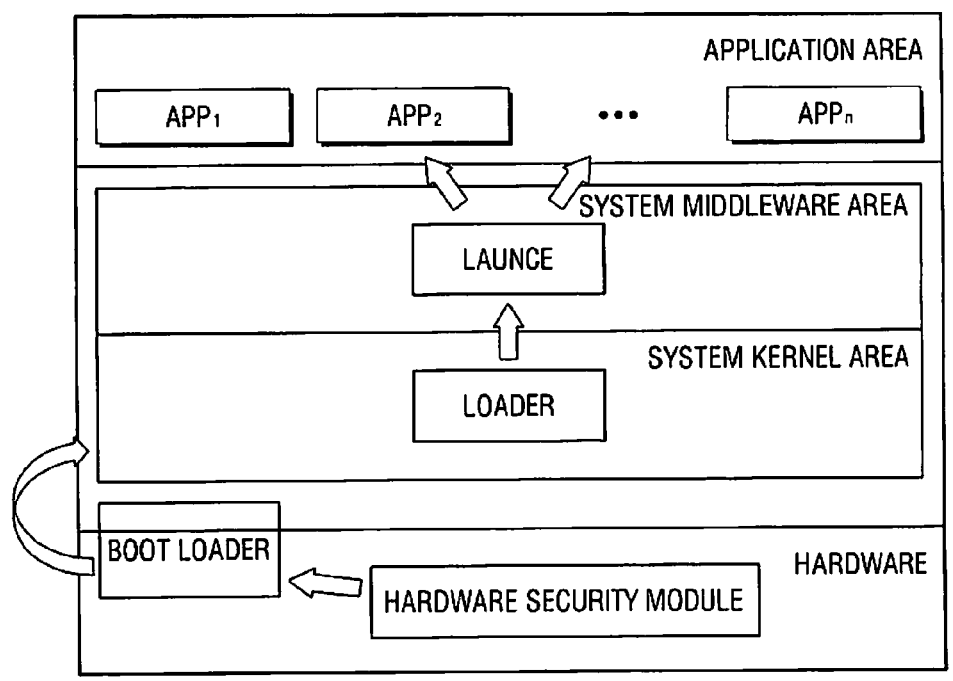
FIG. 5 illustrates the configuration of a software platform of a user terminal according to an embodiment of the present invention.

FIG. 5 illustrates the configuration of a software platform of a user terminal according to an embodiment.

According to the present invention, the launcher of a terminal software platform may perform the operation of parsing a license of an application, which is encrypted to closely unite a user terminal with a system platform and the operation of obtaining a decryption key for decrypting an application content.

The operation of decrypting an actual application is performed by the loader of a platform using a decryption text.

The launcher and loader of a terminal software platform exist generally in a system kernel area and thus, may easily be altered. Therefore, in order to enhance security, a Secure Boot function using a hardware-based security module may be used.

That is, as illustrated in FIG. 5, the launcher and loader of a system kernel may be protected by a Secure Boot as a hardware security module authenticates a boot loader in a trusted platform environment.

The launcher and loader may be protected as a boot loader authenticates a kernel image.

Figure 6:
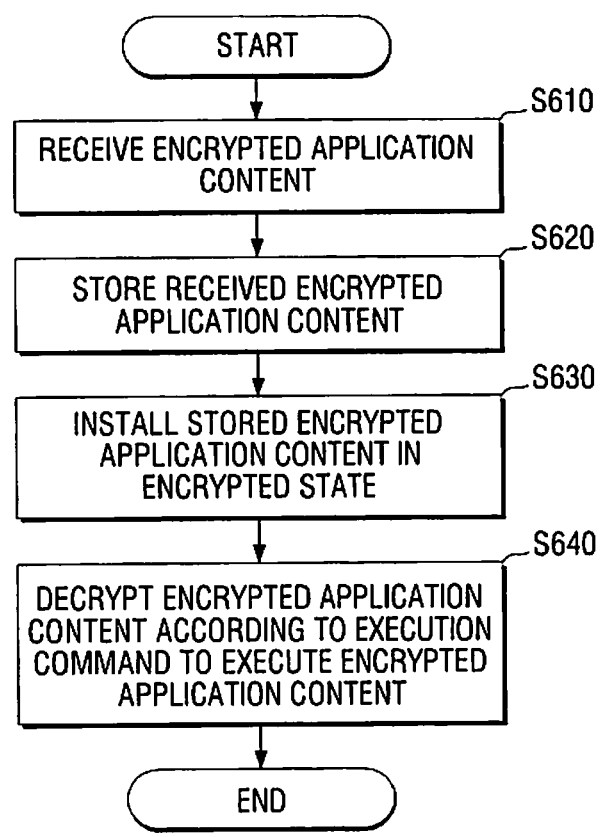
FIG. 6 is a flowchart illustrating a method for controlling a user terminal according to an embodiment of the present invention.

FIG. 6 is a flowchart illustrating a method for controlling a user terminal according to an embodiment.

According to the method for controlling a user terminal illustrated in FIG. 6, a user terminal receives an application content which is at least partially encrypted in step S610, and stores the received encrypted application content in step S620.

The encrypted application content stored in step S620 is installed in an encrypted state in step S630.

Subsequently, the encrypted application content is decrypted according to a command to execute the encrypted application content in step S640.

The application content may be partially encrypted.

Moreover, the application content may include at least one file consisting of an encryption area and a non-encryption area.

At least one file may be divided into predetermined block units, and at least one block may include an encryption area and a non-encryption area.

A file consisting of an encryption area and a non-encryption area may be an executable file for executing an application content.

The operation of parsing the license of an application content and obtaining a decryption key for decrypting the application content may be further included, and decryption may be performed using the obtained decryption key in step S640.

Step S640 may be protected through a Secure Boot function which permits access only to authorized users at the time of booting based on a trusted platform.

According to an embodiment of the present invention, a server may be requested to update an application content. To accomplish this, files needed to be updated from among a plurality of files constituting the application content and a reissued new license for the application content to be updated may be received.

Figure 7:
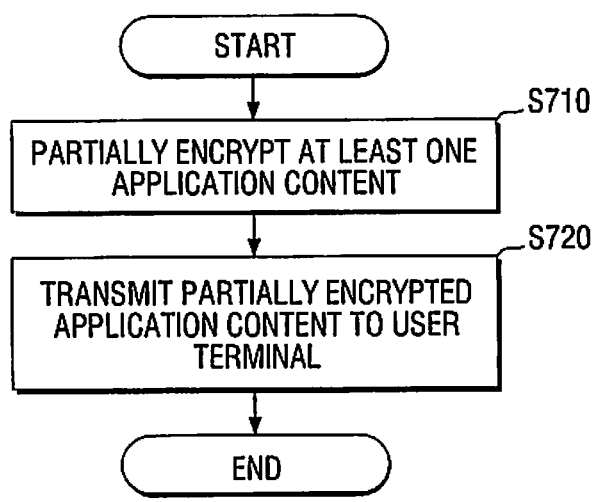
FIG. 7 is a flowchart illustrating a method for controlling a server according to an embodiment of the present invention.

FIG. 7 is a flowchart illustrating a method for controlling a server according to an embodiment.

According to the method for controlling a server illustrated in FIG. 7, at least one application content is partially encrypted in step S710.

The application content which is partially encrypted in step S710 may be transmitted to a user terminal.

Encryption may be performed in step S710 so that at least one file constituting an application content includes an encryption area and a non-encryption area.

Moreover, encryption may be performed in step S710 so that a file is divided into predetermined block units and at least one block includes an encryption area and a non-encryption area.

The file including an encryption area and a non-encryption area may be an executable file for executing an application content. A server may issue a license including a decryption key for decrypting the partially encrypted application content.

The server may receive a request to update the application content from a user terminal. The server may transmit files which need to be updated from among a plurality of files constituting the application content for which update is requested, to the user terminal.

Moreover, the server may receive the ID, current version information and license of the content when the update request is made. In this case, the server may reissue a new license for the content to be updated, and transmit the reissued license and the new version information of the content to be updated to the user terminal.

Figure 8:
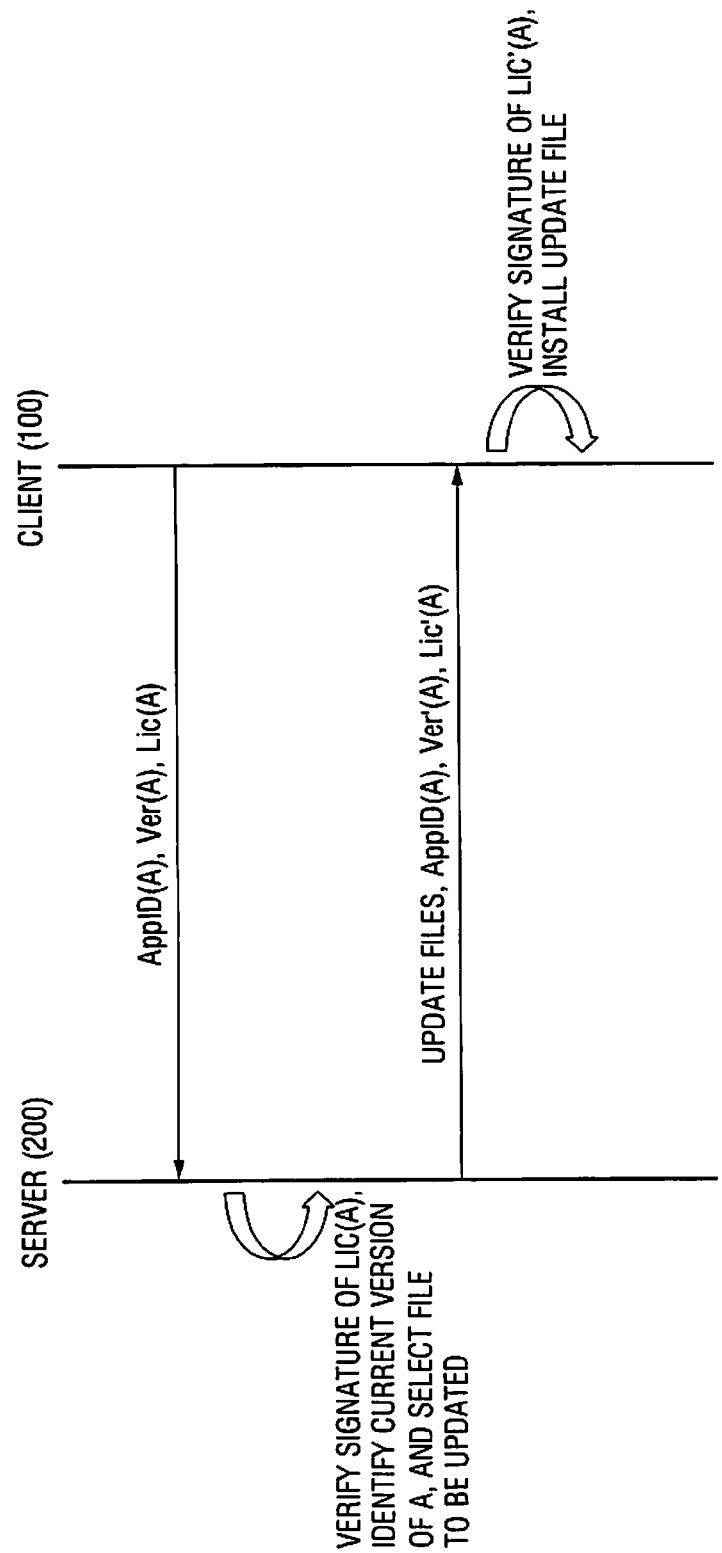
FIG. 8 is a sequence diagram illustrating a method for updating an application content according to another embodiment of the present invention.

FIG. 8 is a sequence diagram illustrating a method for updating an application content according to another embodiment. The client and the server illustrated in FIG. 8 may correspond to the above-mentioned user terminal 100 and the server 200.

According to FIG. 8, if application A needs to be updated, the client 100 transmits an update request to a server. In this case, the ID (AppID(A)), current version information (Ver (A)), and license (Lic(A)) of the application A may be uploaded to the server 200 along with the update request.

The server 200 identifies whether the application A is an authorized application by verifying the signature of the license of the application A, and transmits only the files needed to be updated from among a plurality of files constituting the application A. In some cases, not only the license but also the purchase information of the application A may be confirmed.

The server 200 compares the current version information of the application A transmitted from the client 100 with the final version of the application A in the server and obtain and transmit a list of files to be updated.

The server 200 may reissue a new license (Lic'(A)) of the application A and transmit the new license (Lic'(A)) along with new version information of application A.

The user terminal 100 may verify the signature of the newly transmitted license and install an update file of the application A.

Since applying the configuration of decrypting an encrypted application content when the application content is executed and the configuration of partially encrypting an application content to an updated file of an application content as illustrated in FIGS. 1 to 7 are apparent to those skilled in the related art, detailed explanation regarding this will not be provided.

FIGS. 9A to 9C illustrate the structure of a license applicable to an application content according to an embodiment.

As illustrated in FIG. 9A, the license of an application content may include an Application ID (AppID), current version information, an Application Encryption Key (AEK), application hash information, International Mobile Equipment Identity (IMEI), a CPU serial number, a terminal telephone number, and so on.

Thus, terminal hardware and software platform-dependent information may be included in a license storing a key for decrypting an encrypted application. However, the terminal hardware and software platform-dependent information should be the only identifier for a user terminal and should be a value that is not easy to fabricate, such as IMEI, a CPU serial number, a terminal telephone number, and so on.

Alternatively, as illustrated in FIG. 9B, information regarding a specific user instead of information regarding a corresponding terminal may be combined as International Mobile Subscriber Identity (IMSI) instead of IMEI and a CPU serial number is included in a license.

Instead, as illustrated in FIG. 9C, not only information regarding a corresponding terminal but also information regarding a specific person may be combined.

FIG. 10 illustrates the effect of partial encryption according to an embodiment.

FIG. 10 illustrates measured decryption performance of a partially encrypted application executable file versus an entirely encrypted application executable file. In the experiment, a test is performed in the order of opening a file of a smart phone, reading and decrypting the file and closing the file.

According to the present invention, security may be enhanced as an encrypted application content is downloaded from a user terminal and installed, and the application content is decrypted when it is executed instead of when it is installed.

According to the present invention, the performance of an application DRM system may be enhanced by utilizing the function of partially encrypting an application content. In particular, as the size of a block to be decrypted is significantly reduced at the time of decrypting an application, the effect that the decryption has on an application execution time may be minimized.

Furthermore, as IMEI, a CPU serial number, and telephone number are included in a license, a corresponding application is executed only in a corresponding user terminal, and if an application is transferred to another terminal through a mobile storage apparatus or via network, the installation and usage of the application may be restricted. In some cases, it would be easy to change execution conditions so that a corresponding application may be executed only by a specific user instead of only in a specific terminal.

If it is determined that a system kernel included in a launcher or a loader is not fabricated through a Secure Boot based on a trusted platform, the security of applications which are executed and loaded by the system kernel may also be guaranteed.

Only those files needed to be updated from among a plurality of files constituting an application are downloaded, transmission volume may be significantly reduced.

Further, whether an update is required is determined based on a license uploaded from a user terminal and, thus, a server may perform an update operation reliably even if the server has no purchase record.

Although several embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A user terminal, comprising:
   a communication interface unit which receives an application content, at least a part of which is encrypted;
   a storage unit which stores the received application content;
   a decryption unit which decrypts the application content;
   a user interface unit which receives a command to execute the application content; and
   a controlling unit, in response to the received command, which controls the decryption unit to install the application content, at least a part of which is encrypted, and decrypt the encrypted part of the application content.

2. The user terminal of claim 1, wherein the application content includes at least one file consisting of an encryption area and a non-encryption area.

3. The user terminal of claim 2, wherein the at least one file is divided into predetermined block units and at least one block includes an encryption area and a non-encryption area.

4. The user terminal of claim 1, wherein the file including an encryption area and a non-encryption area comprises an executable file for executing the application content.

5. The user terminal of claim 1, further comprising:
   a license parsing unit which parses a license of the application content and obtains a decryption key for decrypting the application content,
   wherein the decryption unit decrypts the installed encrypted application content using the decryption key.

6. The user terminal of claim 1, wherein the decryption unit is protected by a Secure Boot function which permits access only to authorized users during booting based on a trusted platform.

7. The user terminal of claim 1, wherein the controlling unit requests a server to update the application content, receive files needed to be updated from among a plurality of files constituting the application content, and receive a new license of a content to be updated from the server.

8. A method for controlling a user terminal, the method comprising the steps of:
   receiving an application content, at least a part of which is encrypted;
   storing the received application content;
   installing the stored application content, at least a part of which is encrypted, in an encrypted state; and
   decrypting the application content, at least a part of which is encrypted, in response to a command to execute the application content.

9. The method of claim 8, wherein the application content includes at least one file consisting of an encryption area and a non-encryption area.

10. The method of claim 9, wherein the at least one file is divided into predetermined block units and at least one block includes an encryption area and a non-encryption area.

11. The method of claim 9, wherein the file including an encryption area and a non-encryption area is an executable file for executing the application content.

12. The method of claim 8, further comprising:
    parsing a license of the application content and obtaining a decryption key for decrypting the application content,
    wherein decrypting comprises performing decryption using the decryption key.

13. The method of claim 8, wherein decrypting is protected by a Secure Boot function which permits access only to authorized users during booting based on a trusted platform.

14. The method of claim 8, further comprising:
    requesting a server to update the application content; and
    receiving files needed to be updated from among a plurality of files constituting the application content and a new license of a content to be updated from the server.

* * * * *